United States Patent [19]

Tamai et al.

[11] Patent Number: 4,734,482
[45] Date of Patent: Mar. 29, 1988

[54] POLYIMIDE FROM ETHER DIAMINE HAVING THE INDANE STRUCTURE AND HIGH-TEMPERATURE ADHESIVE OF POLYIMIDE

[75] Inventors: Shoji Tamai, Yokohama; Saburo Kawashima, Yokosuka; Yoshiho Sonobe, Yokohama; Masahiro Ohta, Yokohama; Hideaki Oikawa, Yokohama; Akihiro Yamaguchi, Kamakura, all of Japan

[73] Assignee: Mitsui Toatsu Chemicals, Inc., Tokyo, Japan

[21] Appl. No.: 945,477

[22] Filed: Dec. 23, 1986

[51] Int. Cl.⁴ .................. C08G 63/02; B32B 3/00
[52] U.S. Cl. ............................ 528/185; 427/208.2
[58] Field of Search ............... 528/185; 427/208.2

[56] References Cited

U.S. PATENT DOCUMENTS

4,629,777 12/1986 Pfeifer ........................ 528/185

Primary Examiner—Harold D. Anderson
Assistant Examiner—Frederick Krass
Attorney, Agent, or Firm—Fisher, Christen & Sabol

[57] ABSTRACT

This invention relates to a novel polyimide and describes the method of its preparation, adhesives of the polyimide and the method for their application.

The polyimide has recurring units of the formula

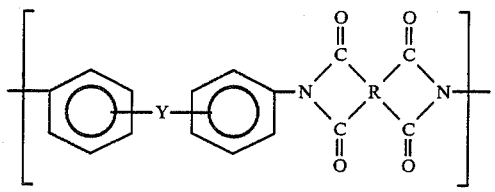

(where Y is

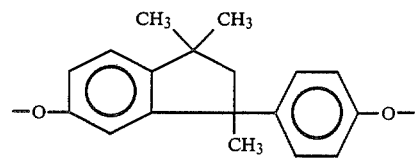

or

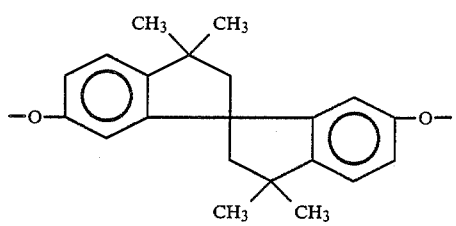

and R is a tetra-valent radical selected from the group consisting of aliphatic radicals having not less than two carbons, cyclo-aliphatic radical, monoaromatic radical, condensed polyaromatic radical, and non condensed polyaromatic radical wherein aromatic radicals are mutually connected with a bond or a crosslinking function).

7 Claims, 3 Drawing Figures

POLYIMIDE FROM ETHER DIAMINE HAVING THE INDANE STRUCTURE AND HIGH-TEMPERATURE ADHESIVE OF POLYIMIDE

The polyimide can be prepared by reacting a diamine with tetracarboxylic dianhydride in organic solvents and imidizing resultant polyamic acid.

The diamine in use is an ether diamine having indan structure and includes
5-(4-aminophenoxy)-3-[4-(4-aminophenoxy)phenyl]-1,1,3-trimethylindan,
5-(3-aminophenoxy)-3-[4-(3-aminophenoxy)phenyl]-1,1,3-trimethylindan,
6,6'-bis(4-aminophenoxy)-3,3,3',3'-tetramethyl-1,1'-spirobiindan and
6,6'-bis(3-aminophenoxy)-3,3,3',3'-tetramethyl-1,1'-spirobiindan.

Various tetracarboxylic dianhydrides can be used and particularly prefered are pyromellitic dianhydride and 3,3',4,4'-benzophenonetetracarboxylic dianhydride.

BACKGROUND OF THE INVENTION

This invention relates to a novel polyimide, method for Preparing the same and high-temperature adhesives of the same.

This invention particularly relates to adhesives having excellent adhesive strength and high-temperature stability.

Various kinds of adhesives are so far known concerning organic synthetic high polymers. Polybenzimidazole and polyimide type adhesives have been developed as those having outstanding stability at high temperatures. Besides other adhesives have also been developed from fluoro resin, polyamideimide, silicone, epoxy novolac, epoxy acryl, nitrile rubber, phenolics and polyester.

The properties of these adhesives are not yet satisfactory because good high-temperature stability causes low adhesive strength while high adhesive strength results in poor high-temperature stability.

Therefore an object of this invention is to provide a novel polyimide for use as the adhesives having excellent bonding strength and durability at high-temperatures for a long period.

Another object of this invention is to provide a method for preparing the same and a method for adhesion by use of the same.

SUMMARY OF THE INVENTION

The inventors have examined hard to improve the bonding strength of adhesives at high temperatures and found a novel polyimide derived from indan derivatives.

The present invention is summarized as follows.

(1) Polyimide having recurring units of the formula (where Y is a divalent radical represented by the formula or which is an indan derivative having two oxy radicals, and Y is bonded to both phenyl radicals either in meta or in para positions, and R is a tetra-valent radical selected from the group consisting of aliphatic radicals having not less than two carbons, cyclo-aliphatic radical, monoaromatic radical, condensed polyaromatic radical, and non condensed polyaromatic radical wherein aromatic radicals are mutually connected with a bond or a crosslinking function).

A method for preparing polyimide having recurring units of the formula (where Y is a divalent radical represented by the formula or which is an indan derivative having two oxy raidicals, and Y is bonded to both phenyl radicals either in meta or in para positions, and R is a tetra-valent radical selected from the group consisting of aliphatic radical having not less than two carbons, cyclo-aliphatic radi- cal, monoaromatic radical, condensed polyaromatic radical, and non condensed polyaromatic radical wherein aromatic radicals are mutually connected with a bond or a crosslinking function), which comprises reacting a diamine having the formula

(where Y is the same as above) with a tetracarboxylic dianhydride having the formula (where R is the same as above) in an organic solvent, and thermally or chemically imidizing resultant polyamic acid having recurring units of the formula (3) A high-temperature adhesive of polyimide having recurring units of the formula

(where Y and R are the same as above).

(4) A method for adhesion which comprises applying polyimide having recurring units of the formula (where Y and R are the same as above) on a substrate, overlapping the applied surface of the substrate with untreated or applied surface of another substrate, and heating under pressure above the glass transition temperature of said polyimide.

(5) A method for adhesion which comprises applying polyamic acid having recurring units of the formula which is a precursor of polyimide, on a substrate, imidizing to give polyimide having recurring units of the formula and overlapping the applied surface of the substrate with untreated or applied surface of another substrate, followed by heating under pressure above the glass transition temperature of said polyimide.

DETAILED DESCRIPTION OF THE INVENTION

A novel polyimide of this invention having recurring units of the formula (where Y is a divalent radical represented by the formula or which is an indan derivative having two oxy radicals, and Y is bonded to both phenyl radicals either in meta or in para positions, and R is a tetra-valent radical selected from the group consisting of aliphatic radical having not less than two carbons, cyclo-aliphatic radical, monoaromatic radical, condensed polyaromatic radical, and non condensed polyaromatic radical wherein aromatic radicals are mutually connected with a bond or a crosslinking function) can be prepared by reacting the following diamine with tetracarboxylic dianhydride in the organic solvents and further cyclizing the resultant polyamic acid by dehydration.

The diamine for use in this invention is the ether diamine having indan structure. The ether diamine having the formula includes 5-(4-aminophenoxy)-3-[4-(4-aminophenoxy)phenyl]-1,1,3-trimethylindan and 5-(3-aminophenoxy)-3-[4-(3-aminophenoxy)phenyl]-1,1,3-trimethylindan.

Another type of ether diamine having the formula included 6,6'-bis(4-aminophenoxy)-3,3,3',3'-tetramethyl-1,1'-spirobiindan and 6,6'-bis(3-aminophenoxy)-3,3,3',3'-tetramethyl-1,1'-spirobiindan.

These ether diamines can be used singly or in mixtures.

Tetracarboxylic dianhydride for use in the method of this invention has the formula (where R is a tetra-valent radical selected from the group consisting of aliphatic radical having not less than two carbons, cycloaliphatic radical, monoaromatic radical, condensed polyaromatic radical, and non condensed polyaromatic radical wherein aromatic radicals are mutually connected with a bond or a crosslinking function).

Tetracarboxylic dianhydride used in the method includes, for example, ethylene tetracarboxylic dianhydride, cyclopentane tetracarboxylic dianhydride, pyromellitic dianhydride, 3,3',4,4'-benzophenone tetracarboxylic dianhydride, 2,2',3,3'-benzophenone tetracarboxylic dianhydride, 3,3',4,4'-biphenyl tetracarboxylic dianhydride, 2,2',3,3'-biphenyl tetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis-(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalene tetracarboxylic dianhydride, 1,4,5,8-naphthalene tetracarboxylic dianhydride, 1,2,5,6-naphthalene tetracarboxylic dianhydride, 1,2,3,4-benzene tetracarboxylic dianhydride, 3,4,9,10-perylene tetracarboxylic dianhydride, 2,3,6,7-anthracene tetracarboxylic dianhydride and 1,2,7,8-phenanthrene tetracarboxylic dianhydride.

Prefered in particular among these dianhydrides are pyromellitic dianhydride and 3,3',4,4'-benzophenonetetracarboxylic dianhydride.

Tetracarboxylic dianhydride can be used alone or in mixtures of two or more.

The polymer can be normally prepared by reacting ether diamine with tetracarboxylic dianhydride in the organic solvents. The organic solvents used in the reaction include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl] ether, tetrahydrofuran, 1,3-dioxane, 1,4-dioxane, pyridine, picoline, dimethyl sulfoxide, dimethyl sulfone, tetramethylurea and hexamethylphosphoramide. These solvents can be used alone or in mixtures of two or more.

The reaction temperature is normally 60° C. or less, preferably 50° C. or less. The reaction pressure is not restricted in particular and atmospheric pressure is sufficient for carrying out the reaction. The reaction time depends upon the type of solvents, reaction temperature, and raw materials such as diamines and tetracarboxylic dianhydrides, and is normally enough to complete the formation of polyamic acid represented by the undermentioned formula. Reaction for 4 to 24 hours is normally sufficient.

Such reaction affords polyamic acid having recurring units of the formula

In the next step, thermal dehydration of the polyamic acid solution at 100° to 300° C. or chemical dehydration by treating with imidizing agent such as acetic anhydride afford the corresponding polyimide having recurring units of the formula The method of applying the polymer thus obtained for adhesive is roughly divided into two procedures.

(1) The polymer is used as an adhesive solution containing said polyamic acid precursor as a main component, and imidized before adhesion.

(2) The polymer is used in the form of said polyimide as it is.

In the procedure (1), the adhesive solution is an organic solvent solution of polyamic acid. It may be the resultant reaction mixture of polyamic acid obtained by reacting ether diamine with tetracarboxylic dianhydride in the organic solvents. It also may be the solution containing polyamic acid as the main component and polyimide which is a cyclized product of polyamic acid. Thus the adhesive solution containing polyamic acid may be the solution or suspension containing polyimide as an auxiliary ingredient.

When applying the adhesive containing such polyamic acid, a thin layer of polyamic acid is formed on the adherends to be bonded, followed by preheating the coated adherends in air for a desired period at temperature of 180°–350° C., preferably 200°–300° C. Excess solvents are removed and the polyamic acid is converted to a more stable polyimide. The adherends are then strongly bonded by pressing under pressure of 1–1,000 kg/cm$^2$ at temperature of 50°–400° C., followed by curing at temperature of 100°–400° C.

In the procedure (2) wherein said polyimide is used for the adhesive, it is roughly divided into three cases.

(a) Said polyimide is used as powder as it is.

(b) Said polyimide is dissolved into the solvents or used in the form of resultant solution at the end of imidization.

(c) Said polyimide is previously formed to films before use.

In these cases, some of said polyamic acid may be contained in said polyimide.

In the case (a), the adherends can be strongly bonded by inserting the powder between the adherends, pressing under pressure of 1–1,000 kg/cm$^2$ at temperature of 50°–400° C. and curing at temperature of 100°–400° C.

In the case (b), the thin layer of polyimide containing solution adhesive is formed on the adherends to be bonded, followed by preheating the adherends in air for the desired period at about 30°–200° C. to remove the solvents. The coated adherends are assembled with other adherends, pressed under pressure of 1–1,000 kg/cm$^2$ at temperature of 50°–400° C. and cured at temperature of 100°–400° C. to give strongly bonded adherends.

EXAMPLES

The present invention will be illustrated with respect to the following Synthetic examples and Examples.

SYNTHETIC EXAMPLE 1

5-(4-Aminophenoxy)-3-[4-(4-aminophenoxy)phenyl]-1,1,3-trimethylindan in use for this invention was prepared as follows.

A reaction vessel equipped with a thermometer and stirrer was charged with 67.1 grams (0.25 mol) of 5-hydroxy-3-(4-hydroxyphenyl)-1,1,3-trimethylindan, 86.7 grams (0.55 mol) of 4-chloronitrobenzene and 250 mol of dimethylsulfoxide. The temperature of the mixture was raised under nitrogen ventilation and maintained at 100°–110° C.

Then 49 grams (0.55 mol) of 45% aqueous sodium hydroxide solution was added dropwise in the course of an hour. After the addition, the reaction was conducted for two hours. After ending the reaction, the resultant mixture was filtered to remove inorganic salt and concentrated under reduced pressure in an evaporator.

The residue thus obtained was mixed with 500 ml of water. The crystals formed were filtered, washed with water and dried to obtain 126.7 grams (99.3% yield) of 5-(4-nitrophenoxy)-3-[4-(4-nitrophenoxy)phenyl]-1,1,3-trimethylindan. The crystals are recrystallized from ethanol to afford a pure product of white needles having a melting point of 214.5°–215.5° C.

| Elementary analysis ($C_{30}H_{26}N_2O_6$) | | | |
|---|---|---|---|
| | C | H | N |
| Calculated (%) | 70.58 | 5.13 | 5.49 |
| Found (%) | 70.60 | 5.05 | 5.51 |

In the next step, a sealed reduction vessel equipped with a stirrer and thermometer was charged with 10.21 grams (0.02 mol) of above 5-(4-nitrophenoxy)-3-[4-(4-nitrophenoxy)phenyl]-1,1,3-trimethylindan, 0.3 gram of Pd/C catalyst and 30 ml of ethanol, and hydrogen gas was introduced with vigorous stirring. The reaction was stopped after absorbing 2760 ml of hydrogen at 62°–68° C. for four hours. After ending the reaction, the resulted mixture was filtered to remove the catalyst and concentrated in the evaporator to recover the solvent.

The concentrated residue was then mixed with 6.5 grams of concentrated hydrochloric acid and 50 ml of 20% aqueous isopropyl alcohol solution and dissolved by heating. The resulting mixture was slowly cooled to separate crystals of 5-(4-aminophenoxy)-3-[4-(4-aminophenoxy)phenyl]-1,1,3-trimethylindan hydrochloride. The crystals were filtered and neutralized with aqueous ammonia in 50 ml of 70% aqueous isopropyl alcohol solution. White needles were separated after being cooled and allowed to stand. The needles were filtered, washed and dried to obtain 7.9 grams (87.6% yield) of 5-(4-aminophenoxy)-3-[4-(4-aminophenoxy)phenyl]-1,1,3-trimethylindan having a melting point of 135°–136.5° C.

| Elementary analysis ($C_{30}H_{30}N_2O_2$) | | | |
|---|---|---|---|
| | C | H | N |
| Calculated (%) | 79.97 | 6.71 | 6.22 |
| Found (%) | 80.02 | 6.73 | 6.17 |
| NMR spectrum | Solvent: acetone-$D_6$ | | |
| | Temperature: room temperature | | |
| 1.05 ppm | (3H singlet) | | |
| 1.35 ppm | (3H singlet) | | |
| 1.65 ppm | (3H singlet) | | |
| 2.25–2.75 ppm | (2H multiplet) | | |
| 3.2–4.2 ppm | (4H singlet) | | |
| 6.6–7.35 ppm | (15H multiplet) | | |
| MS spectrum | | | |
| (M/e) | | | |
| $M^+$ | 450, 435, 312, 250, 217, 108 | | |

SYNTHETIC EXAMPLE 2

5-(3-Aminophenoxy)-3[4-(3-aminophenoxy)phenyl]-1,1,3-trimethylindan in use for this invention was prepared as follows.

A reaction vessel equipped with a stirrer and thermometer was charged with 67.1 grams (0.25 mol) of 5-hydoxy-3-(4-hydroxyphenyl)-1,1,3-trimethylindan, 10.09 grams (0.6 mol) of m-dinitrobenzene, 69.1 grams (0.5 mol) of anhydrous potassium carbonate and 650 ml of N,N-dimethylformamide. The reaction was conducted at 150°–153° C. for seven hours with stirring under nitrogen ventilation.

After ending the reaction, the resultant mixture was filtered to remove in organic salt and concentrated under reduced pressure in an evaporator. The concentrated residue was a brown oil. The residue was mixed with 280 ml of 2-methoxyethanol and 20 ml of water, and dissolved by heating. Crystals were formed when allowed to cool, which were filtered, washed and dried to obtain 112.5 grams (88.1% yield) of 5-(3-nitrophenoxy)-3-[4-(3-nitrophenoxy)phenyl]-1,1,3-trimethylindan.

The crystals were recrystallized from ethanol to afford pure product of light yellow needles having a melting point of 90°–92° C.

| Elementary analysis ($C_{30}H_{26}N_2O_6$) | | | |
|---|---|---|---|
| | C | H | N |
| Calculated (%) | 70.58 | 5.13 | 5.49 |
| Found (%) | 70.62 | 5.18 | 5.43 |

In the next step, a sealed reduction vessel equipped with a stirrer and thermometer was charged with 10.21 grams (0.02 mol) of 5-(3-nitrophenoxy)-3-[4-(3-nitrophenoxy)phenyl]-1,1,3-trimethylindan, 0.3 gram of 5% Pd/C catalyst and 30 ml of ethanol, and hydrogen gas was introduced with vigorous stirring.

The reaction was stopped after absorbing 2760 ml of hydrogen at 62°–68° C. for four hours.

After ending the reaction, the resultant mixture was filtered to remove the catalyst, and concentrated in the evaporator to recover the solvent.

The concentrated residue was then mixed with 6.5 grams of concentrated hydrochloric acid and 50 ml of 20% aqueous isopropyl alcohol solution, dissolved by heating and hot-filtered after adding active carbon.

The filtrate was added dropwise to a dilute aqueous ammonia solution to separate precipitates. The precipitates were filtered, washed and dried to obtain 8.5 grams (94.3% yield) of 5-(3-aminophenoxy)-3-[4-aminophenoxy)phenyl]-1,1,3-trimethylindan having a melting point of 70°–72° C.

| Elementary analysis ($C_{30}H_{30}N_2O_2$) | | | |
|---|---|---|---|
| | C | H | N |
| Calculated (%) | 79.97 | 6.71 | 6.22 |
| Found (%) | 80.12 | 6.76 | 6.20 |
| NMR spectrum | Solvent: acetone-$D_6$ | | |
| | Temperature: room temperature | | |
| 1.05 ppm | (3H singlet) | | |
| 1.35 ppm | (3H singlet) | | |
| 1.65 ppm | (3H singlet) | | |
| 2.3–2.5 ppm | (2H multiplet) | | |
| 3.6–4.2 ppm | (4H singlet) | | |
| 6.0–7.3 ppm | (15H multiplet) | | |
| MS spectrum | | | |
| (M/e) | | | |
| $M^+$ | 450, 435, 312, 250, 218 | | |

SYNTHETIC EXAMPLE 3

6,6'-Bis(4-aminophenoxy)-3,3,3',3'-tetramethyl-1,1'-spirobiindan in use for this invention was prepared as follows.

A reaction vessel equipped with a stirrer, thermometer and reflux condenser was charged with 77.1 grams (0.25 mol) of 6,6'-dihydroxy-3,3,3',3'-tetramethyl-1,1'-spirobiindan, 86.7 grams (0.55 mol) of 4-chloronitrobenzene, 41.4 grams (0.3 mol) of anhydrous potassium carbonate and 350 ml of N,N-dimethylformamide. The reaction was conducted at 150°–153° C. for 8 hours with stirring under nitrogen ventilation.

After ending the reaction, the resultant mixture was diluted with 350 ml of water. The separated light yellow precipitates were filtered, washed successively with isopropyl alcohol and water, and dried to obtain 133.5 grams (97% yield) of 3,3,3',3'-tetramethyl-6,6'-bis-(4-nitrophenoxy)-1,1'-spirobiindan.

Pure 3,3,3',3'-tetramethyl-6,6'-bis(4-nitrophenoxy)-1,1'-spirobiindan having a melting point of 200.5°–201.5° C. was obtained as white needles by recrystallizing from 2-methoxyethanol.

| Elementary analysis ($C_{33}H_{30}N_2O_6$) | | | |
|---|---|---|---|
| | C | H | N |
| Calculated (%) | 72.0 | 5.49 | 5.09 |
| Found (%) | 71.92 | 5.39 | 5.11 |

In the next step, a sealed reduction vessel equipped with a stirrer and thermometer was charged with 11 grams (0.02 mol) of above 3,3,3',3'-tetramethyl-6,6'-bis(4-nitrophenoxy)-1,1'-spirobiindan, 0.3 gram of Pd/C catalyst and 40 ml of 2-methoxyethanol, and hydrogen gas was introduced with vigorous stirring. The reaction was stopped after absorbing 2650 ml of hydrogen at 70°–80° C. for eight hours.

After ending the reaction, the resultant mixture was hot-filtered to remove the catalyst and cooled. The separated crystals were filtered, washed with isopropyl alcohol and dried. The obtained white flaky crystals are 8.5 grams (86.6% yield) of 6,6'-bis(4-aminophenoxy)-3,3,3',3'-tetramethyl-1,1'-spirobiindan having a melting point of 214°–215° C.

Results on elementary analysis and MS spectrum are as follows.

| Elementary analysis ($C_{33}H_{34}N_2O_2$) | | | |
|---|---|---|---|
| | C | H | N |
| Calculated (%) | 80.77 | 6.98 | 5.71 |
| Found (%) | 80.62 | 7.05 | 5.70 |
| MS spectrum | | | |
| (M/e) | | | |
| $M^+$ | 490, 475, 238, 65 | | |

SYNTHETIC EXAMPLE 4

6,6'-Bis(3-aminophenoxy)-3,3,3',3'-tetramethyl-1,1'-spirobiindan in use for this invention was prepared as follows.

A reaction vessel equipped with a stirrer, thermometer and reflux condenser was charged with 77.1 grams (0.25 mol) of 6,6'-dihydroxy-3,3,3',3'-tetramethyl-1,1'-spirobiindan, 100.9 grams (0.6 mol) of m-dinitrobenzene, 69.1 grams (0.5 mol) of anhydrous potassium carbonate and 650 ml of N,N-dimethylformamide. The reaction was conducted at 150°–153° C. for 12 hours with stirring under nitrogen ventilation.

After ending the reaction, the resultant mixture was diluted with 650 ml of water. The separated light brown precipitates were filtered, washed with isopropyl alcohol and dried to obtain 116.5 grams (84.6% yield) of 3,3,3',3'-tetramethyl-6,6'-bis(3-nitrophenoxy)-1,1'-spirobiindan.

Pure 3,3,3',3'-tetramethyl-6,6'-bis(3-nitrophenoxy)-1,1'-spirobiindan having a melting point of 173.5°–175°

C. was obtained as light brown needles by recrystallizing from ethanol.

| Elementary analysis (C₃₃H₃₀N₂O₆) | | | |
|---|---|---|---|
| | C | H | N |
| Calculated (%) | 72.0 | 5.49 | 5.09 |
| Found (%) | 71.83 | 5.39 | 5.10 |

In the next step, a sealed reduction vessel equipped with stirrer and thermometer was charged with 11 grams (0.02 mol) of above 3,3,3',3'-tetramethyl-6,6'-bis(3-nitrophenoxy)-1,1'-spirobiindan, 0.3 gram of Pd/C catalyst and 40 ml of 2-methoxyethanol, and hydrogen gas was introduced with vigorous stirring. The reaction was stopped after absorbing 2650 ml of hydrogen at 70°–80° C. for eight hours.

After ending the reaction, the resultant mixture was hot-filtered to remove the catalyst and diluted with 50 ml of isopropyl alcohol. The separated crystals were filtered, washed with isopropyl alcohol and dried. The obtained white needles are 7.5 grams (76.4% yield) of 6,6'-bis(3-aminophenoxy)-3,3,3',3'-tetramethyl-1,1'-spirobiindan having a melting point of 206° C.

Results on elementary anaylsis, NMR spectrum and MS spectrum are as follows.

| Elementary analysis (C₃₃H₃₄N₂O₂) | | | |
|---|---|---|---|
| | C | H | N |
| Calculated (%) | 80.77 | 6.98 | 5.71 |
| Found (%) | 80.62 | 7.05 | 5.70 |
| NMR spectrum | Solvent: acetone-D₆ | | |
| | Temperature: room temperature | | |
| 1.4 ppm | (12H doublet) | | |
| 2.2–2.5 ppm | (4H multiplet) | | |
| 6.0–6.5 ppm | (8H multiplet) | | |
| 6.7–7.3 ppm | (6H multiplet) | | |
| MS spectrum | | | |
| (M/e) | | | |
| M⁺ | 490, 475, 238, 65 | | |

EXAMPLE 1

A reaction vessel equipped with a stirrer, reflux condenser and nitrogen inlet tube was charged with 4.5 grams (0.01 mol) of 5-(4-aminophenoxy)-3-[4-(4-aminophenoxy)phenyl]-1,1,3-trimethylindan and 20.0 grams of N,N-dimethylacetamide, and added with 2.18 grams (0.01 mol) of pyromellitic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 2.04 dl/g at 35° C. in 0.5% N,N-dimethylacetamide solution.

A part of the polyamic acid solution was casted on a glass plate and heated for one hour each at 100° C., 200° C. and 300° C.

The polyimide film thus obtained had a glass transition temperature of 297° C. in accordance with TMA penetration method and a five percent weight decrease temperature in air of 515° C. in accordance with DTA-TG.

The polyimide film was inserted between cold rolled steel panels (JIS, G3141, spcc/SD, 25×100×1.6 mm) which were preheated at 130° C. and pressed for five minutes at 340° C. with pressure of 20 kg/cm². The bonded specimen had a lap shear strength of 260 kg/cm² at room temperature and 205 kg/cm² at 240° C. in accordance with JIS-K6848 and K6850.

EXAMPLE 2

The same reaction vessel as Example 1 was charged with 4.5 grams (0.01 mol) of 5-(4-aminophenoxy)-3-[4-(4-aminophenoxy)phenyl]-1,1,3-trimethylindan and 20.0 grams of N,N-dimethylacetamide, and added with 2.18 grams (0.01 mol) of pyromellitic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 2.04 dl/g.

The polyamic acid solution was applied on a cold rolled steel panel which was previously washed with trichloroethylene, and dried for one hour each at 100° C. and 220° C. The polyamic acid was converted to polyimide. The coated panel was overlapped with another cold rolled steel panel and pressed for five minutes at 340° C. with pressure of 20 kg/cm².

The bonded specimen thus obtained had a lap shear strength of 270 kg/cm² at room temperature and 210 kg/cm² at 240° C. 270 kg/cm

EXAMPLE 3

A reaction vessel as Example 1 was charged with 4.5 grams (0.01 mol) of 5-(4-aminophenoxy)-3-[4-(4-aminophenoxy)phenyl]-1,1,3-trimethylindan and 20.0 grams of N,N-dimethylacetamide, and added with 2.10 grams (0.096 mol) of pyromellitic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 0.82 dl/g.

After diluting the polyamic acid solution by adding 39.4 grams of N,N-dimethylacetamide, 2.02 grams (0.02 mol) of triethylamine and 4.08 grams (0.04 mol) of acetic anhydride were added and stirring was further continued at room temperature under nitrogen atmosphere. Yellow powder of polyimide was started to precipitate at about an hour after the addition, and the stirring was further continued for 12 hors.

The separated polyimide powder was filtered, washed with methanol and acetone, and dried at 180° C. for five hours under reduced pressure.

Figure 1:
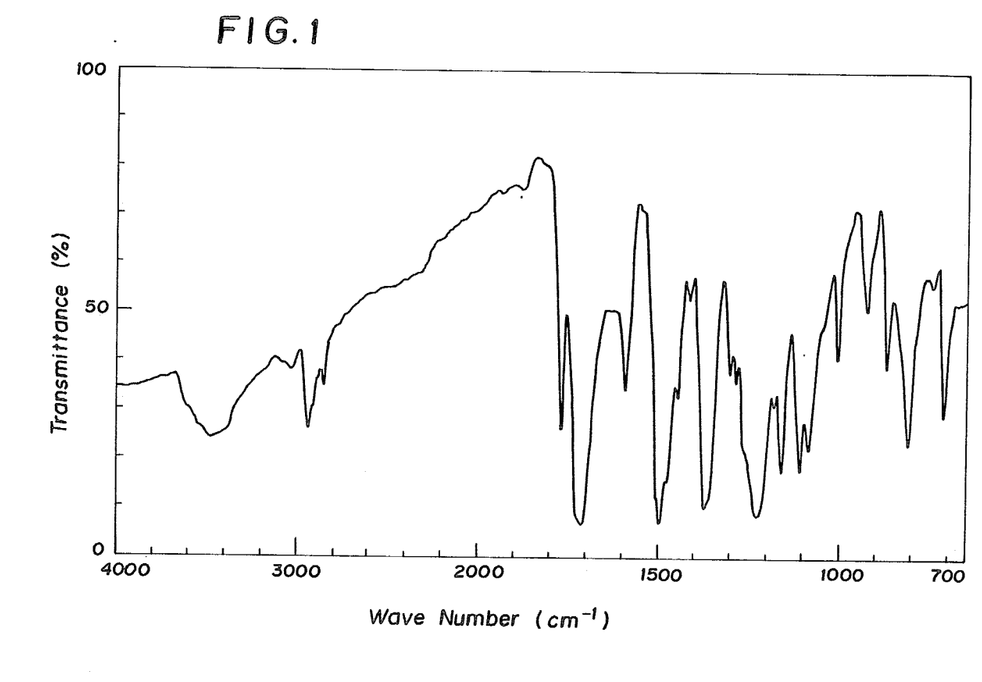
FIGS. 1, 2 and 3 are IR absorption spectrum atlas of the polyimide in three Examples of this invention.

FIG. 1 illustrates IR absorption spectrum of the polyimide powder obtained. The spectrum atlas shows remarkable absorption at around 1780 cm⁻¹ and 1720 cm⁻¹ which are characteristic absorption bands of imide.

The polyimide powder thus obtained was suspended in methanol, applied on a cold rolled steel panel and dried at 100° C. for 30 minutes. The applied panel was overlapped with another cold rolled steel panel and pressed at 340° C. for five minutes with pressure of 20 kg/cm². The bonded specimen had a lap shear strength of 275 kg/cm² at room temperature and 213 kg/cm² at 240° C.

EXAMPLE 4

A reaction vessel equipped with a stirrer, reflux condenser and nitrogen inlet tube was charged with 45.0 grams (0.1 mol) of 5-(4-aminophenoxy)-3[4-(4-aminophenoxy)phenyl]-1,1,3-trimethylindan and 231.6 grams of N,N-dimethylacetamide and added with 32.2 grams (0.1 mol) of 3,3',4,4'-benzophenonetetracarboxylic dianhydride in parts at room of 3,3',4,4'-benzophenonetetracarboxylic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 1.45 dl/g.

A part of the polyamic acid solution was casted on a glass plate and heated for one hour each at 100° C., 200° C. and 300° C.

The polyimide film thus obtained had a glass transition temperature of 262° C. and five percent weight decrease temperature in air of 508° C. The film also had a tensile strength of 13.2 kg/mm² and elongation of 10% in accordance with ASTM D-882.

The polyimide film was inserted between cold rolled steel panels which were preheated at 130° C. and pressed for five minutes at 340° C. with pressure of 20 kg/cm². The bonded specimen had a lap shear strength of 254 kg/cm² at room temperature and 201 kg/cm² at 240° C.

EXAMPLE 5

The same reaction vessel as Example 4 was charged with 45.0 grams (0.1 mol) of 5-(4-aminophenoxy)-3-[4-(4-aminophenoxy)phenyl]-1,1,3-trimethylindan and 231.6 grams of N,N-dimethylacetamide, and added with 32.2 grams (0.1 mol) of 3,3',4,4'-benzophenonetetracarboxylic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 1.45 dl/g.

The polyamic acid solution was applied on two cold rolled steel panels which were previously washed with trichloroethylene and dried for one hour each at 100° C. and 220° C. The coated panels were overlapped the surfaces each other and pressed for five minutes at 340° C. with pressure of 20 kg/cm².

The bonded specimen thus obtained had a lap shear strength of 260 kg/cm² at room temperature and 195 kg/cm² at 240° C.

EXAMPLE 6

The same reaction vessel as Example 4 was charged with 45.0 grams (0.1 mol) of 5-(4-aminophenoxy)-3-[4-(4-aminophenoxy)phenyl]-1,1,3-trimethylindan and 231.6 grams of N,N-dimethylacetamide and added with 32.2 grams (0.1 mol) of 3,3',4,4'-benzophenonetetracarboxylic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 1.45 dl/g.

After diluting 100 grams of the polyamic acid solution by adding 150 grams of N,N-dimethylacetamide, 6.54 grams (0.065 mol) of triethylamine and 13.2 grams (0.13 mol) of acetic anhydride were added and stirring was continued at room temperature under nitrogen atmosphere. The stirring was further continued for 12 hours.

The separated polyimide powder was filtered, washed with methanol and acetone, and dried at 180° C. for five hours under reduced pressure.

The polyimide powder thus obtained was applied on a cold rolled steel panel.

The applied panel was overlapped with another cold rolled steel panel and pressed at 340° C. for five minutes with pressure of 20 kg/cm².

The bonded specimen had a lap shear strength of 255 kg/cm² at room temperature and 201 kg/cm² at 240° C.

EXAMPLE 7

The same reaction vessel as Example 1 was charged with 4.5 grams (0.01 mol) of 5-(3-aminophenoxy)-3-[4-(3-aminophenoxy)phenyl]-1,1,3-trimethylindan and 20 grams of N,N-dimethylacetamide and added with 2.18 grams (0.01 mol) of pyromellitic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 1.90 dl/g.

A part of the polyamic acid solution was casted on a glass plate and heated for one hour each at 100° C., 200° C. and 300° C.

The polyimide film thus obtained had a glass transition temperature of 237° C. and five percent weight decrease temperature in air of 503° C. The film also had a tensile strength of 8.9 kg/mm² and elongation of 6%.

The polyimide film was inserted between cold rolled steel panels which were preheated at 130° C. and pressed for five minutes at 340° C. with pressure of 20 kg/cm². The bonded specimen had a lap shear strength of 320 kg/cm² at room temperature and 225 kg/cm² at 220° C.

EXAMPLE 8

The same reaction vessel as Example 1 was charged with 4.5 grams (0.01 mol) of 5-(3-aminophenoxy)-3-[4-(3-aminophenoxy)phenyl]-1,1,3-trimethylindan and 20.0 grams of N,N-dimethylacetamide and added with 2.1 grams (0.096 mol) of pyromellitic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 0.78 dl/g.

After diluting the polyamic acid solution by adding 39.4 grams of N,N-dimethylacetamide, 2.02 grams (0.02 mol) of triethylamine and 3.06 grams (0.03 mol) of acetic anhydride were added and stirring was continued at room temperature under nitrogen atmosphere. The stirring was further continued for 12 hours.

The separated polyimide powder was filtered, washed with methanol and acetone, and dried at 180° C. for five hours under reduced pressure.

The polyimide powder thus obtained was applied on a cold rolled steel panel.

The applied panel was overlapped with another cold rolled steel panel and pressed at 340° C. for five minutes with pressure of 20 kg/cm².

The bonded specimen had a lap shear strength of 310 kg/cm² at room temperature and 215 kg/cm² at 220° C.

EXAMPLE 9

The same reaction vessel as Example 1 was charged with 4.5 grams (0.01 mol) of 5-(3-aminophenoxy)-3-[4-(3-aminophenoxy)phenyl]-1,1,3-trimethylindan and 23.2 grams of N,N-dimethylacetamide and added with 3.22 grams (0.01 mol) of 3,3',4,4'-benzophenonetetracarboxylic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 1.25 dl/g.

A part of the polyamic acid solution was casted on a glass plate and heated for one hour each at 100° C., 200° C. and 300° C.

The polyimide film thus obtained had a glass transition temperature of 214° C. and five percent weight decrease temperature in air of 507° C. The film also had a tensile strength of 14.8 kg/mm$^2$ and elongation of 9%.

The polyimide film was inserted between cold rolled steel panels which were preheated at 130° C. and pressed for five minutes at 340° C. with pressure of 20 kg/cm$^2$. The bonded specimen had a lap shear strength of 300 kg/cm$^2$ at room temperature and 218 kg/cm$^2$ at 200° C.

EXAMPLE 10

The same reaction vessel as Example 1 was charged with 4.5 grams (0.01 mol) of 5-(3-aminophenoxy)-3-[4-(3-aminophenoxy)phenyl]-1,1,3-trimethylindan and 23.2 grams of N,N-dimethylacetamide and added with 3.22 grams (0.01 mol) of 3,3',4,4'-benzophenonetetracarboxylic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 1.25 dl/g.

The polyamic acid solution was applied on a cold rolled steel panel which was previously washed with trichloroethylene and dried for one hour each at 100° C. and 220° C. The coated panel was overlapped with another cold rolled steel panel and pressed for five minutes at 340° C. with pressure of 20 kg/cm$^2$.

The bonded specimen thus obtained had a lap shear strength of 310 kg/cm$^2$ at room temperature and 220 kg/cm$^2$ at 200° C.

EXAMPLE 11

A reaction vessel equipped with a stirrer, reflux condenser and nitrogen inlet tube was charged with 49.0 grams (0.10 mol) of 6,6'-bis(4-aminophenoxy)-3,3,3',3'-tetramethyl-1,1'-spirobiindan and 211.1 grams of N,N-dimethylacetamide, and added with 21.36 grams (0.098 mol) of pyromellitic dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 0.58 dl/g.

After diluting the polyamic acid solution by adding 422.1 grams of N,N-dimethylacetamide, 20.2 grams (0.2 mol) of triethylamine and 30.6 grams (0.3 mol) of acetic anhydride were added and stirring was further continued at room temperature under nitrogen atmosphere. Yellow powder of polyimide was started to precipitate at about two hours after the addition, and the stirring was further continued for 12 hours.

The separated polyimide powder was filtered, washed with methanol and acetone, and dried at 180° C. for five hours under reduced pressure.

Figure 2:
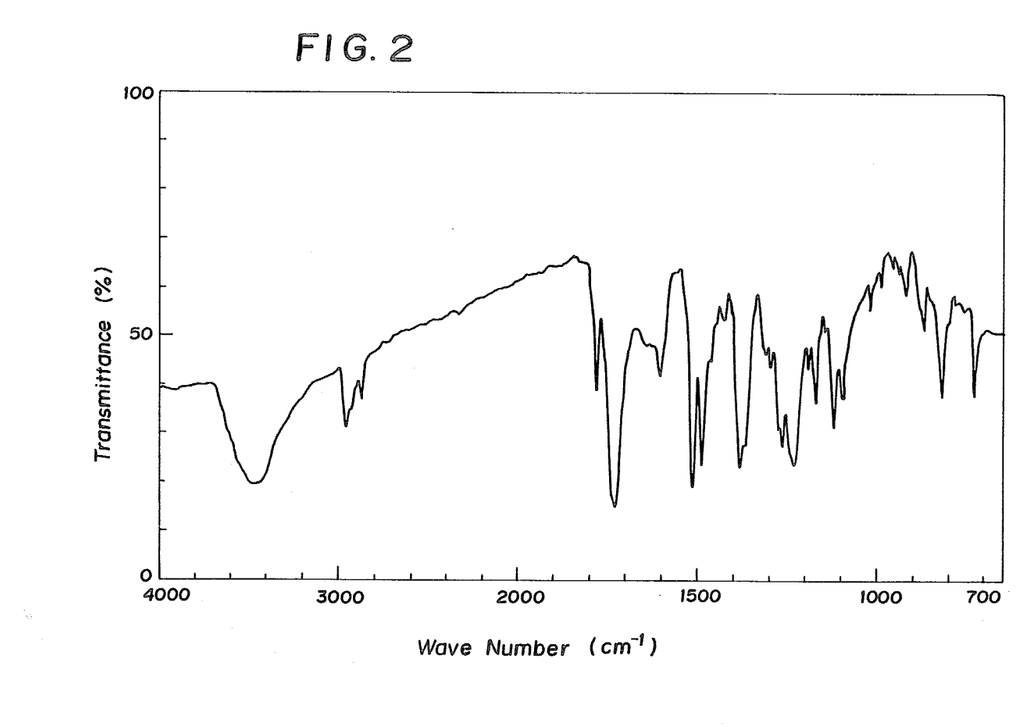

FIG. 2 illustrates IR absorption spectrum of the polyimide powder obtained. The spectrum atlas shows remarkable absorption at around 1780 cm$^{-1}$ and 1720 cm$^{-1}$ which are characteristic absorption bands of imide.

The polyimide powder thus obtained was applied on a cold rolled steel panel and dried at 100° C. for 30 minutes.

The applied panel was overlapped with another cold rolled steel panel and pressed at 340° C. for five minutes with pressure of 20 kg/cm$^2$.

The bonded specimen had a lap shear strength of 130 kg/cm$^2$ at room temperature and 100 kg/cm$^2$ at 240° C.

EXAMPLE 12

The same reaction vessel as Example 11 was charged with 49.0 grams (0.10 mol) of 6,6'-bis(3-aminophenoxy)-3,3,3',3'-tetramethyl-1,1'-spirobiindan and 211.1 grams of N,N-dimethylacetamide, and added with 21.36 grams (0.098 mol) of pyromellitic dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 0.79 dl/g.

The polyamic acid solution was applied on a cold rolled steel panel which was previously washed with trichloroethylene and dried for one hour each at 100° C. and 220° C. The coated panel was overlapped with another cold rolled steel panel and pressed for five minutes at 340° C. with pressure of 20 kg/cm$^2$.

The bonded specimen thus obtained had a lap shear strength of 250 kg/cm$^2$ at room temperature and 180 kg/cm$^2$ at 240° C.

EXAMPLE 13

The same reaction vessel as Example 11 was charged with 49.0 grams (0.10 mol) of 6,6'-bis(3-aminophenoxy)-3,3,3',3'-tetramethyl- 1,1'-spirobiindan and 211.1 grams of N,N-dimethylacetamide, and added with 21.36 grams (0.098 mol) of pyromellitic dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 0.79 dl/g.

A part of the polyamic acid solution was casted on a glass plate and heated for one hour each at 100° C., 200° C. and 300° C.

The polyimide film thus obtained had a glass transition temperature of 253° C. and five percent weight decrease temperature in air of 501° C.

The polyimide film was inserted between cold rolled steel panels which were preheated at 130° C. and pressed for five minutes at 340° C. with pressure of 20 kg/cm$^2$.

The bonded specimen had a lap shear strength of 260 kg/cm$^2$ at room temperature and 185 kg/cm$^2$ at 240° C.

EXAMPLE 14

The same reaction vessel as Example 11 was charged with 49.0 grams (0.10 mol) of 6,6'-bis(3-aminophenoxy)-3,3,3',3'-tetramethyl-1,1'-spirobiindan and 211.1 grams of N,N-dimethylacetamide, and added with 21.36 grams (0.098 mol) of pyromellitic dianhydride in portions at room temperature under nitrogen atmosphere with care not to raise the solution temperature above 30° C. The reaction mixture was further stirred for 20 hours at room temperature.

Polyamic acid thus obtained had an inherent viscosity of 0.79 dl/g.

After diluting 100 grams of the polyamic acid solution by adding 150 grams of N,N-dimethylacetamide, 7.13 grams (0.07 mol) of triethylamine and 14.4 grams (0.14 mol) of acetic anhydride were added and stirring was further continued at room temperature for 12 hours under nitrogen atmosphere. Red brown solution of polyimide thus obtained was added to 1000 grams of methanol.

The separated polyimide powder was filtered, washed with methanol and acetone, and dried at 180° C. for five hours under reduced pressure.

Figure 3:
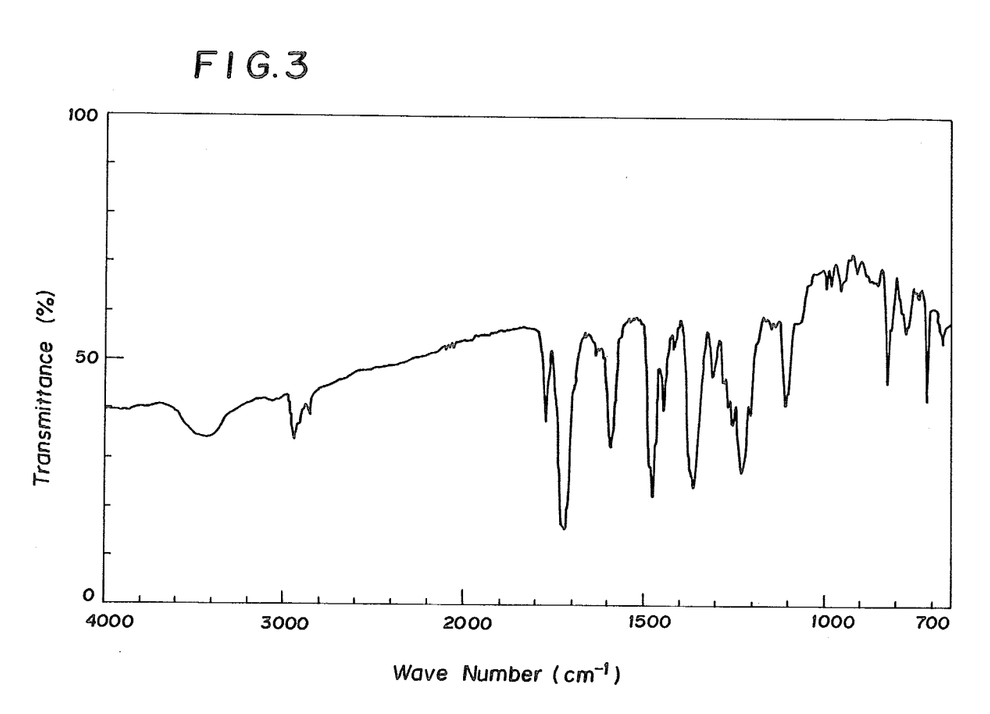

FIG. 3 illustrates IR absorption spectrum of the polyimide powder obtained. The spectrum atlas shows remarkable absorption at around 1780 cm$^{-1}$ and 1720 cm$^{-1}$ which are characteristic absorption bands of imide.

The polyimide powder thus obtained was applied on a cold rolled steel panel and dried at 100° C. for 30 minutes.

The applied panel was overlapped with another cold rolled steel panel and pressed at 340° C. for five minutes with pressure of 20 kg/cm$^2$.

The bonded specimen had a lap shear strength of 263 kg/cm$^2$ at room temperature and 190 kg/cm$^2$ at 240° C.

EXAMPLE 15

The same reaction vessel as Example 11 was charged with 49.0 grams (0.1 mol) of 6,6'-bis(3-aminophenoxy)-3,3,3',3'-tetramethyl-1,1'-spirobiindan and 241.7 grams of N,N-dimethylacetamide and added with 31.56 grams (0.098 mol) of 3,3',4,4'-benzophenonetetracarboxylic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 0.66 dl/g.

A part of the polyamic acid solution was casted on a glass plate and heated for one hour each at 100° C., 200° C. and 300° C.

The light yellow transparent polyimide film thus obtained had a glass transition temperature of 226° C. and five percent weight decrease temperature in air of 503° C. The film also had a tensile strength of 8.9 kg/mm$^2$ and elongation of 6%.

The polyimide film was inserted between cold rolled steel panels which were preheated at 130° C. and pressed for five minutes at 340° C. with pressure of 20 kg/cm$^2$. The bonded specimen had a lap shear strength of 260 kg/cm$^2$ at room temperature and 180 kg/cm$^2$ at 200° C.

EXAMPLE 16

The same reaction vessel as Example 11 was charged with 49.0 grams (0.1 mol) of 6,6'-bis(3-aminophenoxy)-3,3,3',3'-tetramethyl-1,1'-spirobiindan and 241 7 grams of N,N-dimethylacetamide and added with 31.56 grams (0.098 mol) of 3,3',4,4'-benzophenonetetracarboxylic dianhydride in parts at room temperature under nitrogen atmosphere with care not to raise the solution temperature above 30° C. The reaction mixture was further stirred for 20 hours at room temperature.

Polyamic acid thus obtained had an inherent viscosity of 0.66 dl/g.

After diluting 100 grams of the polyamic acid solution with 150 grams of N,N-dimethylacetamide, 6.54 grams (0.065 mol) of triethylamine and 13.2 grams (0.13 mol) of acetic anhydride were added and stirring was further continued at room temperature under nitrogen atmosphere. The stirring was further continued for 12 hours.

The separated polyimide powder was filtered, washed with methanol and acetone, and dried at 180° C. for five hours under reduced pressure.

The polyimide powder thus obtained was applied on a cold rolled steel panel and dried at 100° C. for 30 minutes.

The applied panel was overlapped with another cold rolled steel panel and pressed at 340° C. for five minutes with pressure of 20 kg/cm$^2$.

The bonded specimen had a lap shear strength of 265 kg/cm$^2$ at room temperature and 181 kg/cm$^2$ at 200° C.

We claim:

1. Polyimide having recurring units of the formula (where Y is a divalent radical represented by the formula or which is an indan derivative having two oxy radicals, and Y is bonded to both phenyl radicals either in meta or in para positions, and R is a tetravalent radical selected from the group consisting of aliphatic radicals having not less than two carbons, cyclo-aliphatic radical, monoaromatic radical, condensed polyaromatic radical, and non condensed polyaromatic radical wherein aromatic radicals are mutually connected with a bond or a crosslinking function).

2. Polyimide of claim 1 wherein R is a tetravalent radical having the formula

3. A method for preparing polyimide having recurring units of the formula (where Y is a divalent radical represented by the formula or which is an indan derivative having two oxy radicals, and Y is bonded to both phenyl radicals either in meta or in para positions, and R is a tetravalent radical selected from the group consisting of aliphatic radicals having not less than two carbons, cyclo-aliphatic radical, monoaromatic radical, condensed polyaromatic radical, and non condensed polyaromatic radical wherein aromatic radicals are mutually connected with a bond or a crosslinking function), which comprises reacting a diamine having the formula (where Y is the same as above)
with a tetracarboxylic dianhydride having the formula (where R is the same as above)
in an organic solvent, and thermally or chemically imidizing resultant polyamic acid having recurring units of the formula (where Y and R are the same as above).

4. The method for preparing polyimide of claim 3 wherein R is a tetravelent radical having the formula

5. A method for adhesion which comprises applying polyimide having recurring units of the formula (where Y is a divalent radical represented by the formula or which is an indan derivative having two oxy radicals, and Y is bonded to both phenyl radicals either in meta or in para positions, and R is a tetravalent radical selected from the group consisting of aliphatic radicals having not less than two carbons, cyclo-aliphatic radical, monoaromatic radical, condensed polyaromatic radical, and non condensed polyaromatic radical wherein aromatic radicals are mutually connected with a bond or a crosslinking function) on a substrate, overlapping the applied surface of said substrate with untreated or applied surface of another substrate, and heating under pressure above the glass transition temperature of said polyimide.

6. The method for adhesion of claim 5 wherein polyimide is prepared by applying polyamic acid having recurring units of the formula which is a precursor of said polyimide, on a substrate and subsequently imidizing said polyamic acid.

7. The method for adhesion of claim 5 or 6 wherein R is a tetravalent radical having the formula

* * * * *